April 25, 1950  W. H. J. BROCK  2,505,093
PIPE COUPLING
Filed Sept. 14, 1945

Inventor
WILLIAM H. J. BROCK
By Beaman & Langford
Attorneys

Patented Apr. 25, 1950

2,505,093

UNITED STATES PATENT OFFICE 2,505,093

PIPE COUPLING

William Hudson James Brock, Leamington Spa, England, assignor, by mesne assignments, to Aeroquip Corporation, Jackson, Mich., a corporation of Michigan Application September 14, 1945, Serial No. 616,253
In Great Britain June 12, 1944

Section 1, Public Law 690, August 8, 1946
Patent expires June 12, 1964

1 Claim. (Cl. 284—19)

This invention relates to pipe couplings for connecting the ends of sections of piping, or for connecting a section of piping to a reservoir, cylinder or other unit. The invention is specifically concerned with pipe couplings of the kind comprising a pair of easily separable coupling parts, each of which incorporates a valve arranged to close the exposed fluid opening of the coupling part when the latter is uncoupled, and to open automatically as the coupling parts are connected together, thus providing a free fluid passage through the united coupling.

It is an object of the invention to provide an improved pipe coupling in which the valves have sealing means composed of rubber or like soft resilient material, the improved arrangement being such that the tendency of the rubber or equivalent to become abraded is substantially or completely eliminated. The use of such sealing means is, of course, advantageous as it enables the valves to seat in a fluid-tight manner without difficulty, and the invention therefore enables a pipe coupling to be produced which is simple in design and which has a long life with high efficiency.

Figure 1:
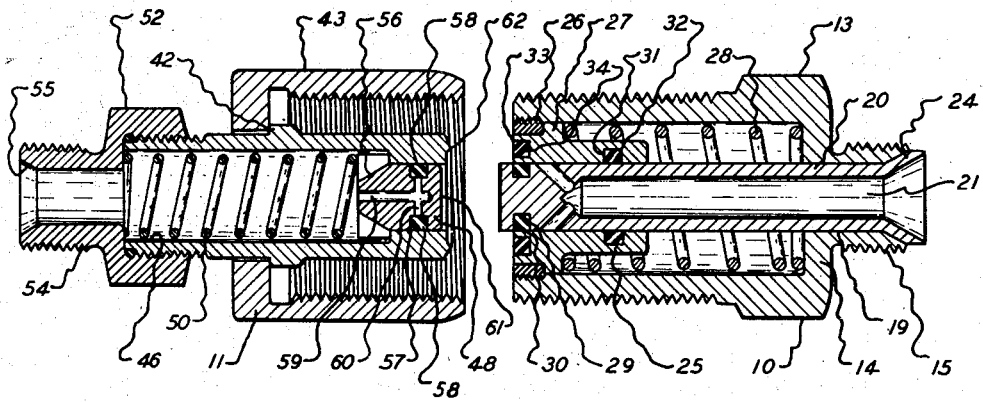
Figure 2:
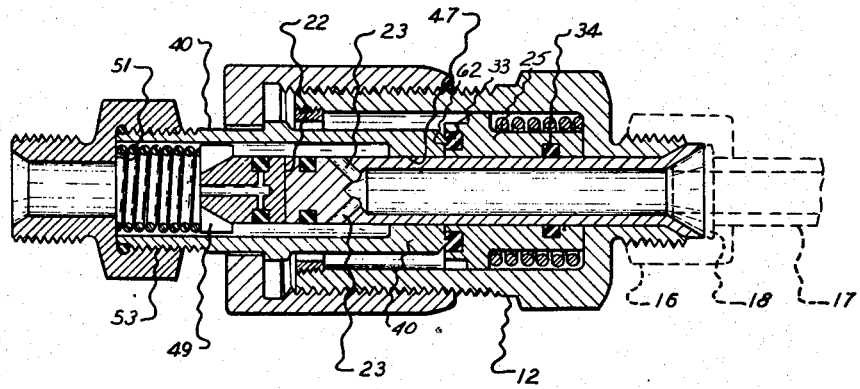

The invention is illustrated by way of example in the accompanying drawings, in which:

Figure 1 is a sectional elevation of an improved coupling, the two coupling parts being separated so that the valves are both closed; and Figure 2 is a view corresponding to Figure 1 showing how the parts co-operate when the coupling is fully connected.

The coupling is constituted by two coupling parts, one being indicated generally at 10 and the other at 11. The said one coupling part 10 comprises a cup-shaped outer body 12 conveniently formed with flats at 13 making it hexagonal in shape so that it can be readily gripped by a spanner. The outer end wall 14 of the body 12 is formed with an axial screw-threaded boss 15 primarily intended for the reception of a union nut 16 which is shown in broken lines and which serves for the attachment of the usual pipe coupling 17, the latter having a head 18 of frusto-conical shape. The boss 15 is formed with an axial bore 19 which accommodates in a freely slidable manner a central stem 20, the latter being tubular for the greater part of its length owing to the provision of an axially drilled passage 21. This passage terminates at a short distance from the inner end surface 22 of the stem 20 and from it extend a plurality of oblique flow passages 23 breaking into the outer curved surface of the stem 20. In normal use the stem 20 is held fixedly in the outer body 12 as its outer end is shaped with a frusto-conical flange or flare 24 arranged to fit snugly within a chamfered portion of the boss 15 and to be clamped thereagainst by the head 18 and union nut 16.

A tubular sleeve 25 slides snugly over the stem 20 and is retained within the body 12 by a stop ring 26 which is screw-threaded into the mouth portion of said body and is engaged by a flange 27 formed upon the sleeve 25, when the coupling is disconnected. The sleeve 25 is urged towards this position by a coiled compression spring 28 bearing at its outer end against the wall 14 and at its inner end against the flange 27. When the sleeve 25 is in this position it closes the outer ends of the flow passages 23 and in order to produce a pressuretight seal the inner end part of the stem 20 is formed with a circumferential groove 29 fitted with a packing ring 30 of rubber or like soft resilient material, said packing ring being arranged to press against the internal surface of the sleeve 25. The sleeve 25, adjacent its outer or right-hand end, is formed with an internal circumferential groove 31 containing a soft resilient packing ring 32, which latter presses inwards against the outer surface of the stem 20. The inner end surface of the sleeve 25 is formed with an annular groove 33 for the reception of a corresponding packing ring 34, which latter is adapted to engage with the tubular body 40 of the coupling part 11 and prevent leakage of fluid when the coupling parts are coupled together as seen in Fig. 2.

The coupling part 11 comprises a tubular body 40 having an external flange 42 which is engaged by a union nut 43, said union nut being screw-threaded internally at 44 so as to co-operate with a corresponding screw-thread 45 upon the outside of the body 12 for drawing the two coupling parts 10 and 11 together when the coupling is being united. The tubular body 40 has for the greater part of its length a bore 46 of uniform diameter, but its inner end part has a bore of reduced diameter, indicated at 47. A valve member 56, comprising a head portion 48 fitting snugly within the bore 47, and a tail portion 49 in the form of a series of radial vanes fitting slidably within the bore 46, is urged towards its inner or right-hand position, as shown in Figure 1, by a coiled compression spring 50 disposed within the bore 46. The outer end of this spring takes abutment upon a shoulder 51 formed upon an adapter member 52 screw-threaded on the outer end of the tubular body 40, as indicated at 53; the outer part of the adapter member 52 is screw-threaded at 54 and is frusto-conical internally at 55 to form part of the usual pipe connection (not shown). The head portion 48 of the valve member 56 has a circumferential groove 57 which is fitted with an endless packing ring 58 of rubber or like soft resilient material. The axial width of the packing ring is such that it fits snugly between the walls of the groove 57 but its diameter and radial thickness are chosen so that the outer surface of the ring is normally flush with, or just below, the outer surface of the cylindrical valve head 48. The valve member 56 has an axial passage 59 leading from its tail end and a number of small radial passages 60 serving to place the "bottom" of the groove 57 into permanent communication with the fluid space within the tubular body 40. With this arrangement the packing ring 58 is expanded by internal fluid pressure into firm engagement with the bore 47 when the valve member is in its closed position, as shown in Figure 1, but when the valve is open (as in Figure 2) the internal and external pressures upon the packing ring 58 are equalised and therefore said ring returns to its natural disposition and lies completely within the groove 57. Thus, as the valve member 56 moves to its closed position the packing ring 58 can slide smoothly into the bore 47 without fear of being abraded by the leading edge of said bore. The inner surface 61 of the valve member 56 is flat so as to fit snugly against the corresponding surface of the stem 20, the diameter of the head portion 48 being equal to or minutely greater than that of the stem 20. The adjacent inner end of the tubular body 40 is preferably formed with a sharp axially directed lip 62 adapted to press into the packing ring 34 when the coupling is united.

It will be seen from Figure 1 that when the coupling parts 10 and 11 are separated the escape of pressure fluid is effectively prevented by the respective valve devices. Thus, in the case of the coupling part 10 the sleeve 25 acts as a valve member by sealing the flow passages 23, as described above; in the case of the coupling part 11 the valve member 56 completely seals the bore 47.

When the two coupling parts are brought together and are axially tightened by means of the union nut 43 the parts eventually assume the positions shown in Figure 2. The bore 47 of the tubular body 40 belonging to the coupling part 11 slides over the tubular stem 20 and pushes the sleeve 25 in an outward direction until said sleeve comes into abutting engagement with the end wall 14 of the outer body 12. At the same time the inner end surface 22 of the tubular stem 20 presses upon the adjacent surface 61 of the valve member 56, thus moving the latter out of and away from the reduced diameter bore 47 of the tubular body 40. As a result free fluid communication is established through the coupling by way of the passage 21, the flow passages 23 and the bore 46. It will be seen that during these normal movements of the valves the packing ring 32 remains in contact with the uninterrupted outer surface of the tubular stem 20 and never reaches the flow passages 23, so that its working surface is preserved from abrasion. The packing ring 30 is also largely preserved from wear by abrasion owing to the fact that during the disconnection of the coupling parts the bore 47 acts as a guide and leads the packing ring 30 smoothly into the bore of the sleeve 25, it being noted that when the coupling is made, as seen in Fig. 2, the end 62 of the tubular body 40 passes into the end packing ring 33 and places the bore 47 and the interior surface of the sleeve 25 in continuous uninterrupted relation, whereby to present a continuous smooth surface to the ring 34 as the parts slide relatively to one another in the coupling and uncoupling operations. If desired the outer (i. e. the left-hand) edge of the bore 47 may be chamfered or rounded for the same purpose.

Owing to the fact that the flat faces 22 and 61 of the central coupling parts engage as soon as the parts are brought together, no air can be included when the parts are coupled, and, as the seal between the two parts is made before the valves began to open, no fluid can escape during either coupling or uncoupling. The seal between the parts may be provided by a narrow edge on one part engaging a flat metal face on the other, instead of the rubber or like seal 34 being used.

It will be seen that the coupling which has been described is so constructed that it may readily be dismantled and efficiently cleaned and sterilised, the tubular stem 20 being withdrawn outwards from the sleeve 25 and body portion 12 by first removing the union nut 16; in a similar manner the valve member 56 and spring 50 can be easily withdrawn from the tubular body 40 by removing the adapter member 52. If necessary the sleeve 25 and spring 28 can also be removed by unscrewing the stop ring 26. The coupling may therefore be used for fluids for alimentary or medicinal purposes, in dealing with which repeated cleaning is essential to avoid contamination of the fluid by impurities, or by the deterioration of fluid retained in the coupling for long periods.

It will be understood that the coupling which has been described is given merely by way of example and that various modifications may be made in the design and arrangement of the parts.

What I claim is:

In a coupling of the kind comprising a pair of body parts having valves which close to seal their respective body parts when the latter are disconnected and having telescoping tube portions. one said tube portion containing a self-sealing valve and the other tube portion having a closed end and fluid ports with a self-sealing sleeve valve slidable thereon in end-wise abutting relationship with respect to the first said tube portion, fluid sealing means for maintaining a fluid tight seal between the second said tube portion and said sleeve on opposite sides of said fluid ports to the exclusion of any near abrading action upon said sealing means, said sealing means comprising an exterior annular recess on said second tube portion between its said closed end and said ports, a sealing ring in said recess adapted to permit the said sleeve to slide thereover in fluid sealing relationship but permanently fixed in spaced position with respect to the said fluid ports, an annular recess on the interior of said sleeve on the opposite side of said fluid ports, a sealing ring in said last mentioned annular recess adapted to have fluid tight sealing relation with respect to said second tube portion, and stop means on the coupling body part carrying the latter and said sleeve, said stop means being adapted to cooperate with said sleeve to limit movement thereof to prevent the sealing ring on said sleeve from passing over said fluid ports. the construction and arrangement being such that both said sealing rings are free from abrading by a passage over the fluid port openings and the said sleeve and the said first tube portion slide in continuous uninterrupted relation with respect to the said fixed sealing ring in the coupling and uncoupling operations.

WILLIAM HUDSON JAMES BROCK.

REFERENCES CITED

The following references are of record in the file of this patent:

UNITED STATES PATENTS

| Number | Name | Date |
|---|---|---|
| 976,402 | Segal et al. | Nov. 22, 1910 |
| 1,013,731 | Benkiser | Jan. 2, 1912 |
| 1,335,521 | Murphy | Mar. 30, 1920 |
| 1,710,635 | Wertz | Apr. 23, 1921 |
| 1,679,257 | Neebe | July 31, 1928 |
| 1,850,879 | Hunt | Mar. 22, 1932 |
| 1,968,421 | Proctor | July 31, 1934 |
| 2,185,173 | Fortune | Jan. 2, 1940 |
| 2,208,286 | Berger | July 16, 1940 |
| 2,210,282 | Corbin | Aug. 6, 1940 |
| 2,304,390 | Wolfram | Dec. 8, 1942 |
| 2,311,239 | Main et al. | Feb. 16, 1943 |

FOREIGN PATENTS

| Number | Country | Date |
|---|---|---|
| 581,087 | Great Britain | Oct. 1, 1946 |